United States Patent [19]
Dwight

[11] Patent Number: 5,884,508
[45] Date of Patent: Mar. 23, 1999

[54] SECURITY ADAPTER

[75] Inventor: Mark M. Dwight, Palo Alto, Calif.

[73] Assignee: ACCO Brands, Inc., Lincolnshire, Ill.

[21] Appl. No.: 787,619

[22] Filed: Feb. 3, 1997

[51] Int. Cl.$^6$ .................................................. E05B 73/00
[52] U.S. Cl. ................................... 70/18; 70/58; 248/553
[58] Field of Search ................................ 70/58, 18, 30, 70/49; 248/551–553

[56] References Cited

U.S. PATENT DOCUMENTS

| | | | |
|---|---|---|---|
| D. 344,033 | 2/1994 | Davidge | 10/106 D |
| 2,480,662 | 8/1949 | McKinzie . | |
| 2,729,418 | 1/1956 | Maynard . | |
| 3,664,163 | 5/1972 | Foote | 70/58 |
| 3,727,934 | 4/1973 | Averbook et al. | 70/58 X |
| 3,866,873 | 2/1975 | Bohli | 248/205 A |
| 4,004,440 | 1/1977 | Dreyer | 70/15 |
| 4,028,913 | 6/1977 | Falk | 70/58 |
| 4,065,083 | 12/1977 | Grassaway | 248/19 |
| 4,212,175 | 7/1980 | Zakow | 70/58 |
| 4,223,542 | 9/1980 | Basseches | 70/58 |
| 4,535,990 | 8/1985 | Yamada | 273/173 |
| 4,570,465 | 2/1986 | Bennett | 70/18 |
| 4,669,691 | 6/1987 | Solomon | 248/165 |
| 4,691,891 | 9/1987 | Dionne | 248/65 |
| 4,733,840 | 3/1988 | D'Amore | 248/205.3 |
| 4,738,428 | 4/1988 | Themistos et al. | 248/551 |
| 4,773,628 | 9/1988 | Aleshire | 254/134.4 |
| 4,822,005 | 4/1989 | Aleshire | 254/134.4 |
| 4,826,193 | 5/1989 | Davis | 280/304.1 |
| 4,842,912 | 6/1989 | Hutter, III | 428/65 |
| 4,843,848 | 7/1989 | Igelmund | 70/58 |
| 4,979,382 | 12/1990 | Perry | 70/58 |
| 4,993,244 | 2/1991 | Osman | 70/30 |
| 5,050,836 | 9/1991 | Makous | 248/553 |
| 5,135,197 | 8/1992 | Kelley et al. | 248/551 |
| 5,197,706 | 3/1993 | Braithwaite et al. | 248/499 |
| 5,228,658 | 7/1993 | Kelley | 248/551 |
| 5,314,162 | 5/1994 | Kelley | 248/553 |
| 5,349,834 | 9/1994 | Davidge | 70/18 |

FOREIGN PATENT DOCUMENTS 987121 4/1976 Canada .

OTHER PUBLICATIONS

Kablit Security system Catalog, pp. 7, 93, 1988.

*Primary Examiner*—Lloyd A. Gall
*Attorney, Agent, or Firm*—Townsend & Townsend and Crew LLP

[57] ABSTRACT

A retrofit security adapter for adding a security slot to a portable device, such as a portable electronic device (laptop computer or electronic organizer). The adapter is made of ABS plastic made from a plastic formulation into which fiberglass fiber fill has been added prior to molding. The desired range of fiber fill is in the range of about 20% to about 40%, with about 30% most preferable. The adapter is adhered to the portable device using any suitable adhesive.

8 Claims, 2 Drawing Sheets

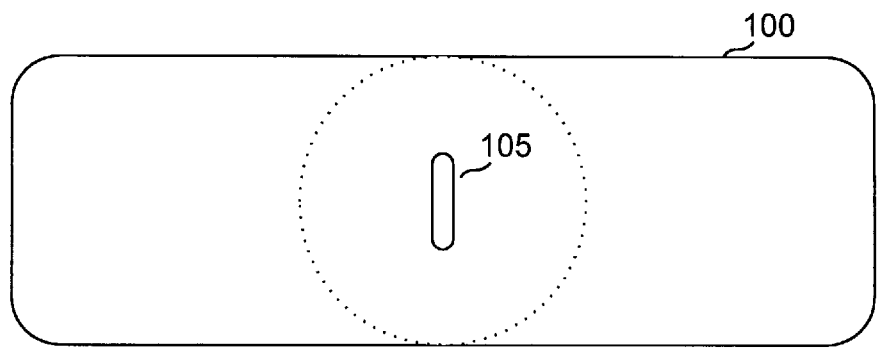
FIG_1
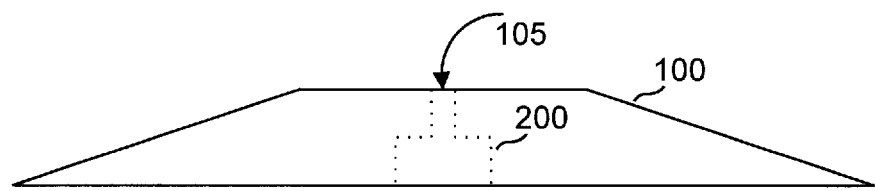
FIG_2
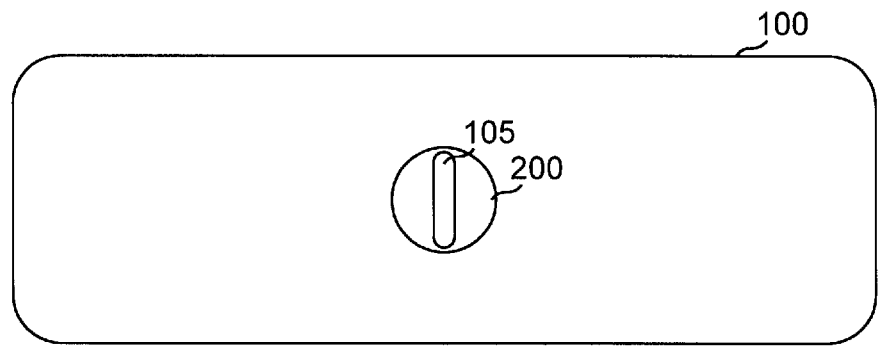
FIG_3

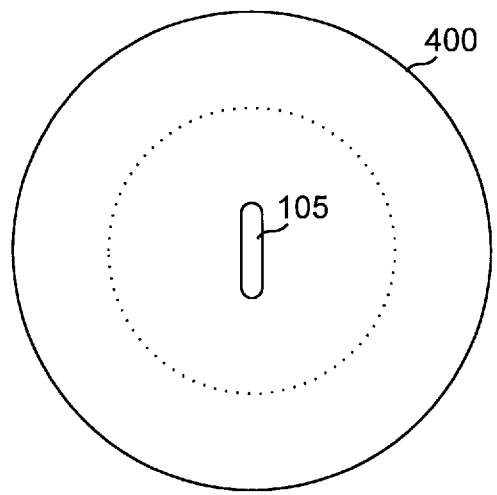
FIG_4
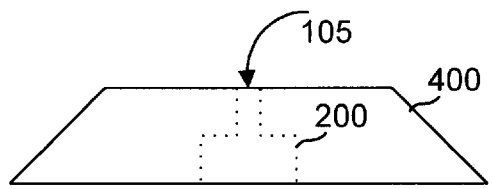
FIG_5
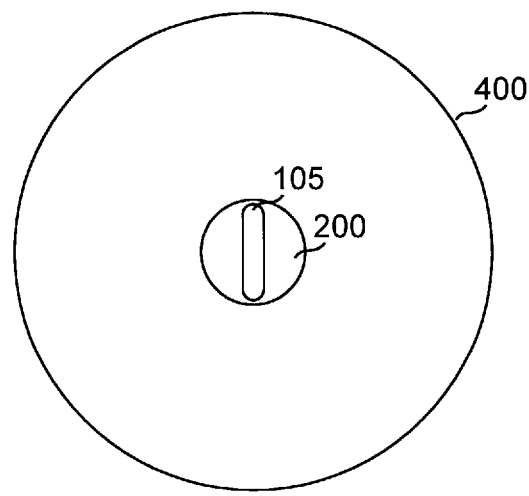
FIG_6

SECURITY ADAPTER

BACKGROUND OF THE INVENTION

The present invention relates generally to security products for portable devices, and more specifically it relates to an adapter for retrofitting a valuable portable device with a security slot.

Portable devices, such as laptop computers, personal organizers and the like, are frequently the subject of theft. Consequently, Kensington® Microware Limited developed and promulgated a security slot standard for use with its MICROSAVER® security lock. U.S. Pat. No. 5,327,752, U.S. Pat. No. 5,381,685, U.S. Pat. No. 5,502,989, U.S. Pat. No. 5,493,878, U.S. Pat. No. D347,987 and U.S. Pat. No. D346,733, each hereby incorporated by reference for all purposes, define various locking devices for interfacing to security slots that may be incorporated into the walls of portable devices, for example, laptop computers. The security locks have proven to be an effective deterrent to theft of the portable devices. Unfortunately, the security locks may not be used with devices that do not have a security slot. The KENSINGTON® standard slot is increasingly being incorporated into more and more portable devices.

Not every portable device is manufactured with a necessary security slot. As a consequence, it is desirable to develop a retrofit security slot adapter that may be used with a portable device to enable the security locks to secure the portable device. It is important that such retrofit adapters be attachable with minimal equipment and potential damage to the portable device. Once attached, the retrofit adapter must resist efforts to shear, pull, pry or otherwise remove the adapter from the portable device. In addition, the retrofit adapter should be made of a material sufficiently strong to retain the security lock within the security slot.

To satisfy these requirements, some early versions of adapters were made of metal adhered directly to the wall of a portable device. While being sufficiently strong, such adapters were too rigid. As a consequence, metal adapters must either be relatively large to provide enough surface area to adequately adhere to a portable device, or were prone to being sheared or pried from the wall of the portable device. As portable devices are reduced in size, it becomes increasingly impractical to use large metal adapters. In addition, metal adapters may be relatively more expensive to manufacture than adapters made from other material.

An improvement to metal-only adapters incorporates a flexible elastomeric spacer between the metal adapter and the electronic device. Two layers of adhesive, one between the adapter and the spacer, and one between the spacer and the electronic device provide improved flexibility and resistance to removal over the metal-only adapter.

SUMMARY OF THE INVENTION

The present invention provides a retrofit adapter that is a single non-metal piece adhered directly to the wall of the portable device. It is strong enough to retain a security lock, it is flexible enough to resist removal, and it may be made small enough to conform to the smaller dimensions of today's portable devices.

In one preferred embodiment, the retrofit adapter is manufactured of ABS plastic having a range of about 20%–40%, most preferably about 30%, randomized fiber fill. A "super glue" such as a cyanoacrylate bonds the adapter directly to the portable device. Although in certain applications any suitable adhesive, including multi-part epoxy-type adhesives, may be used.

The preferred embodiment of the adapter is therefore strong, flexible and relatively inexpensive as compared to prior art adapters.

Reference to the remaining portions of the specification, including the drawing and claims, will realize other features and advantages of the present invention. Further features and advantages of the present invention, as well as the structure and operation of various embodiments of the present invention, are described in detail below with respect to accompanying drawing. In the drawing, like reference numbers indicate identical or functionally similar elements.

BRIEF DESCRIPTION OF THE DRAWINGS

FIG. 1 is a top plan view of a retrofit security adapter including security slot;

FIG. 2 is a side plan view of the retrofit security adapter and illustrating a preferred locking cavity;

FIG. 3 is a bottom plan view of the retrofit security adapter;

FIG. 4 is a top plan view of an alternate embodiment for a retrofit security adapter including a security slot;

FIG. 5 is a side plan view of the alternate retrofit security adapter and illustrating a preferred locking cavity; and FIG. 6 bottom plan view of the alternate retrofit security adapter.

DESCRIPTION OF THE PREFERRED EMBODIMENT

FIG. 1 is a top plan view of a retrofit security adapter 100 including a security slot 105. In the preferred embodiment, adapter 100 is generally rectangular and is dimensioned to overlie a flat surface of the portable device, without overhang to inhibit prying or removal. The actual dimensions depend upon design considerations, such as desired bond strength and the dimensions of suitable flat areas of typical portable devices to be retrofitted with a security slot. In the preferred embodiment, adapter 100 has a length of about 2 inches and a width of about 0.75 inches, with sharply ramped sides.

Security slot 105, in the preferred embodiment, conforms to Kensington's security standard available from Kensington® Microware Limited, San Mateo, Calif. that is incorporated into many portable devices, such as laptop computers. This standard security slot has general dimensions of about 7 mm×3 mm, though other slot dimensions are possible, depending upon a particular application. The standard is hereby incorporated by reference for all purposes.

Adapter 100 includes a body of ABS plastic that has been formed using a plastic formulation that includes about 20% to about 40%, by weight, of fibers such as glass or carbon fibers. Most preferably, the fiber fill percentage is about 30%. It is preferred that the fibers be randomized, such as being thoroughly mixed before being injected into desirable molds. In some applications, it may be necessary to further randomize fiber orientation in an adapter removed from a mold, such as by an abrading step. In some instances, fibers tend to align at the surface of the mold. Thus, a simple abrading step will randomize the surface fibers.

For attaching the security adapter to the portable device, any suitable adhesive may be used. In the preferred embodiment, the portable device is a portable electronic device such as a laptop computer made of ABS plastic. By making the adapter from the same material and using a suitable adhesive (such as a cyanoacrylate) which in this case bonds well with the ABS plastic, an effective retrofit adapter that adequately bonds to the portable device is formed. In other applications, it may be desirable to use a different material and adhesive, depending upon the characteristics of the materials used in making the portable device. Different portable devices may require different materials for the adapter as well as a different adhesive. The interaction between ABS plastic and cyanoacrylate is known and a similar interaction may be induced in the future due to a different type of adhesive and construction material.

FIG. 2 is a side plan view of retrofit security adapter 100 and illustrating a preferred locking cavity 200. Locking cavity 200 is designed, in the preferred embodiment, to permit a "T"-shaped locking member of a security device to be inserted and turned to a locked position without bottoming out on the surface of the device to which the adapter is adhered. In the locked position, the locking member is not removable from security adapter 100. FIG. 3 is a bottom plan view of the retrofit security adapter 100 illustrating locking cavity 200.

FIG. 4 is a top plan view of an alternate embodiment for a retrofit security adapter 400 including a security slot 105 described above in relation to FIG. 1. FIG. 5 is a side plan view of alternate retrofit security adapter 400 and illustrating use of preferred locking cavity 200. FIG. 6 is a bottom plan view of alternate retrofit security adapter 400 including a view of locking cavity 200.

In conclusion, the present invention provides a simple, efficient cost-effective solution to retrofitting portable devices lacking security slots. While the above is a complete description of the preferred embodiments of the invention, various alternatives, modifications, and equivalents may be used. Therefore, the above description should not be taken as limiting the scope of the invention which is defined by the appended claims.

What is claimed is:

1. A retrofit security adapter for attachment to a portable device for retention of a locking member, comprising:
    a body made of ABS plastic having a region defining a security slot for retention of a locking member, said region having a randomized fiber fill in the range of about 20% to about 40% by weight.

2. The adapter of claim 1 wherein said fiber fill is about 30%.

3. A security system for adding a security slot to a portable device for retention of a locking member, comprising:
    a body made of ABS plastic having a region defining a security slot for retention of a locking member, said region having a randomized fiber fill in the range of about 20% to about 40% by weight; and
    a cyanoacrylate adhesive for bonding said body to the portable device.

4. The security system of claim 3 wherein said fiber fill is about 30%.

5. A security pad for retention of a locking member, comprising:
    a body, made of ABS plastic, defining a region for a security slot for retention of a locking member, said region having about 30% fiber fill by weight.

6. A security pad for retention of a locking member, comprising:
    a body made of ABS plastic defining a security slot for retention of a locking member wherein a region of said body surrounding said security slot includes about 30% randomized fiber fill by weight.

7. A retrofit security system for adding a security slot for retention of a locking member to a surface of a portable device, comprising:
    a body dimensioned to overlie the surface of the portable device without overlapping an edge of the portable device and made of ABS plastic defining the security slot for retention of a locking member wherein a region of said body surrounding said security slot includes about 30% randomized fiber fill by weight; and
    a cyanoacrylate adhesive for coupling said body to the surface.

8. A retrofit security adapter for attachment to a portable device, comprising:
    a body made of ABS plastic having a region defining a security slot and a front surface and a rear surface, wherein said front surface defines a first aperture narrower than a second aperture defined by said rear surface and wherein said rear surface includes a cavity for retention of a locking member and wherein said region has a randomized fiber fill in the range of about 20% to about 40% by weight.

* * * * *